United States Patent [19]

Bench et al.

[11] Patent Number: 4,734,628

[45] Date of Patent: Mar. 29, 1988

[54] ELECTRICALLY COMMUTATED, VARIABLE SPEED COMPRESSOR CONTROL SYSTEM

[75] Inventors: Ronald W. Bench, Kirkville; Robert W. Peitz, Fayetteville, both of N.Y.

[73] Assignee: Carrier Corporation, Syracuse, N.Y.

[21] Appl. No.: 936,423

[22] Filed: Dec. 1, 1986

[51] Int. Cl.$^4$ .................... H02P 5/16; F25D 17/00
[52] U.S. Cl. .................. 318/309; 318/345 E; 318/599; 318/811; 62/228.1; 62/217; 62/126
[58] Field of Search .............. 318/309, 310, 312, 314, 318/316, 317, 318, 326, 327, 328, 329, 331, 332, 333, 334, 341, 339, 345, 601, 603, 606, 599, 634, 641, 708, 788, 792, 811, 471, 472; 62/156, 168, 155, 160, 176.6, 226, 225, 228.1, 228.4, 228.5, 215, 324.6, 176.3, 324.1, 230, 323.4, 323.3, 217, 218, 225, 201, 188, 126, 254, 244; 236/35.3, 74 A, 78 B, 78 C, 78 D; 237/2 R

[56] References Cited

U.S. PATENT DOCUMENTS

| | | | |
|---|---|---|---|
| 4,257,238 | 3/1981 | Kountz et al. | 62/228.1 X |
| 4,258,301 | 3/1981 | Kawa | 318/603 X |
| 4,259,845 | 4/1981 | Norbeck | 62/228.1 X |
| 4,282,718 | 8/1981 | Kountz et al. | 62/228.1 X |
| 4,322,671 | 3/1982 | Kawada et al. | 318/811 X |
| 4,345,442 | 8/1982 | Dorman | 62/228.1 X |
| 4,361,794 | 11/1982 | Kawada et al. | 318/811 X |
| 4,371,819 | 2/1983 | Kaufmann | 318/345 E X |
| 4,417,452 | 11/1983 | Ruminsky et al. | 62/156 X |
| 4,487,029 | 12/1984 | Hidaka et al. | 62/323.4 X |
| 4,575,667 | 3/1986 | Kurakake | 318/811 X |
| 4,581,569 | 4/1986 | Fujioka et al. | 318/811 |
| 4,590,771 | 5/1986 | Shaffer et al. | 62/156 |
| 4,608,833 | 9/1986 | Kountz | 62/228.1 |
| 4,623,827 | 11/1986 | Ito | 318/599 |
| 4,646,534 | 3/1987 | Russell | 62/217 X |
| 4,667,480 | 5/1987 | Bessler | 318/332 |

Primary Examiner—William M. Shoop, Jr.
Assistant Examiner—Paul Ip
Attorney, Agent, or Firm—Robert H. Kelly

[57] ABSTRACT

A compressor speed control arrangement with provision for selecting compressor speed in view of changes in room ambient temperature, detecting a feedback signal indicative of compressor speed, calculating actual compressor speed, developing an error signal between selected and actual compressor speeds and modifying compressor speed in view of the developed error signal.

6 Claims, 2 Drawing Figures

ELECTRICALLY COMMUTATED, VARIABLE SPEED COMPRESSOR CONTROL SYSTEM

BACKGROUND OF THE INVENTION

The invention herein is directed toward control systems, and particularly control systems for electrically commutated, variable speed (i.e. ECM) motor driven compressors used in heat pump systems.

At present, there is considerable speed variation from unit to unit in electrically commutated, variable speed motor driven compressors. The speed variation in typical electrically commutated, variable speed motor driven compressors may be as great as twenty (20) percent from a given nominal value, particularly with open loop electrically commutated motor controllers.

This speed variation, depending upon the particular compressor installed in the heat pump system, results in poor control over the operation of the entire heat pump system, possibly causing discomfort to individuals located in the spaces to be heated, ventilated or air conditioned by the heat pump system. Additionally, since the compressor speeds are not controlled effectively, motor speeds over time may be too low or too high with respect to optimum or nominal design. This detrimentally affects the long term maintenance and operability of the compressor and heat pump system. In fact, the lack of speed control can have clearly destructive effects upon many of the individual equipment components comprising the system itself.

SUMMARY OF THE INVENTION

Accordingly, to promote more accurate and effective speed control of electrically commutated motor controllers and compressors, the invention herein directs itself toward a heat pump control arrangement or system based upon a logic sequence effective for monitoring and correcting compressor operating speed in view of compressor loading conditions such as for example differences between a temperature set point and room ambient temperature. In particular, a conversion of speed control signal to operational duty cycle information is accomplished, and the result is provided to the ECM controller, enabling the controller to vary compressor speed in view of a duty cycle input speed request. The controller further applies a time delay during compressor speed change, concurrently monitoring compressor speed repeatedly, based upon commutating pulses from the motor controller. The monitored speeds are compared to a requested speed indication to establish an error signal, which in turn in converted into a duty cycle indication for input to the motor controller, thereby establishing closed loop compressor speed control effective for maintaining compressor speed within predetermined limits.

According to one version of the invention, an ECM controller arrangement is provided for controlling the operational speed of an electrically commutated, variable speed motor compressor driven by an electrically commutated motor, said ECM controller arrangement effective for producing feedback signals representative of compressor speed, and comprising compressor speed logic means for establishing a requested speed indication, compressor speed calculation means for calculating compressor speed from feedback signals produced by said electrically commutated motor controller, error means for establishing the error between said requested speed indication and said calculated compressor speed, said error means effective for producing an error signal indicative of said error, and duty cycle generator means for producing a speed control signal representative of said error signal, said speed control signal being transmitted to the ECM controller for adjusting the speed of said compressor.

According to another version of the invention, a method is provided for controlling the operational speed of an electrically commutated motor (ECM) compressor driven by an electrically commutated motor controller which is effective for producing feedback signals representative of compressor speed, comprising the steps of setting a desired, predetermined compressor speed, establishing a feedback signal indicative of actual compressor speed, conducting a compressor speed calculation, developing an error signal between said calculated and set compressor speeds, establishing therefrom a speed control signal for application to said ECM controller, and modifying compressor speed in response to the level of said speed control signal to effect reduction in the level of said error signal.

The invention is accomplished according to one version, by setting compressor speed as a function of old and new room ambient temperature differences—in other words for example as a function of $d_nK_1+(d_n-d_o)K_2$, where dn and do are respectively new and old room ambient temperature differences with respect to a selected set point temperature, as will be seen herein.

DESCRIPTION OF THE PREFERRED EMBODIMENT

Figure 1:
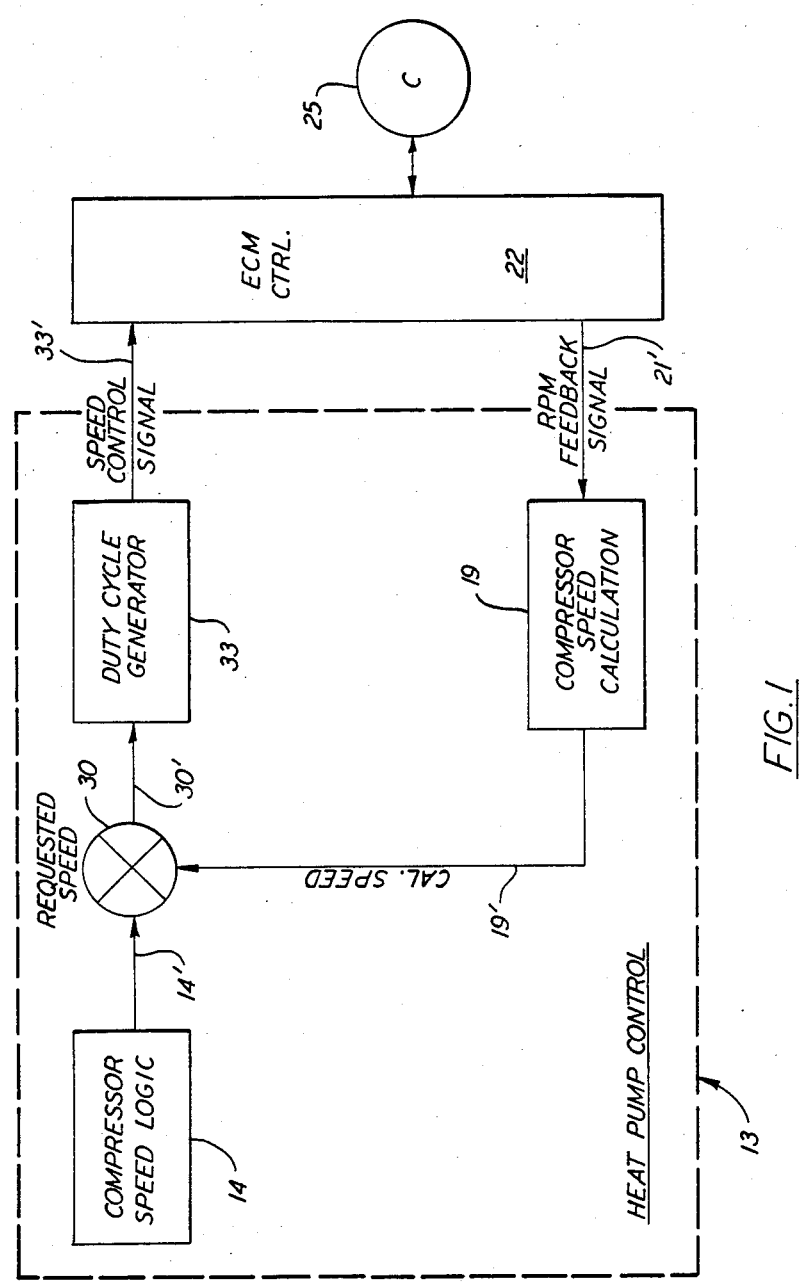
FIG. 1 sets forth in block diagram form, the scheme of the system control logic, according to the invention herein.

FIG. 1 shows in block diagram form, a heat pump control arrangement 13, according to the invention herein. The heat pump control arrangement 13 includes compressor speed logic element 14 effective for producing a signal indication 14' of desired or requested speed. According to one embodiment, compressor speed logic element 14 produces requested speed indication 14' by establishing old and new room ambient temperature differences "$d_o$" and "$d_n$" and setting indication 14' equal to the quantity $d_nK_1+(d_n-d_o)K_2$, where $K_1$ and $K_2$ are experimentally developed system characteristic constants. The old and new room ambient temperatures "$d_o$" and $d_n$ are considered old and new history indications with respect to a thermostat selected set point temperature "$t_s$". Mathematically, $d_o=t_o-t_s$ and $d_n=t_n-t_s$, whre "$t_o$" is an old temperature and "$t_n$" is a new temperature, both of them actually measured, and "$t_s$" is the set temperature. More particularly, indication 14' is a percentage volume between zero (0) and one hundred (100) indicative of the desired or requested speed levels to be input for operation of compressor 25, according to the invention herein.

Indication 14' is combined with a calculated speed indication 19' from compressor speed calculation element 19, which is also a percentage value, and is representative of an RPM feedback signal indication 21' from the electrically commutated motor controller 22 effective for controlling and monitoring the status of electrically commutated motor compressor 25. In particular, controller 22 can be a GE, Ft. Wayne source controller which monitors the back EMF on the power lines connected to the compressor motor poles (not shown), in terms of electrical signals developed, and produces voltage (i.e. RPM feedback) signals indicative thereof. Compressor speed calculation element 19 receives the pulsed analog form of the feedback speed indication 21' in form usable by the control arrangement 13, which is preferably microprocessor based, for example employing an Intel 8032 device, according to one version thereof. More particularly, compressor speed calculation element 19 measures the period between pulses of the RPM feedback signal 21'.

Indications 14' and 19' are combined at element 30 to produce a difference or error signal 30', which expresses the deviation between desired and actual speed values for the compressor. The error signal 30' is accepted by duty cycle generator 33 established for example as a microprocessor look-up table, which produces a speed control signal 33' effective for driving the electrically commutated motor controller 13, according to the invention herein. In particular, for a set frequency of output pulses from duty cycle generator 33, the generator 33 modifies the width of output pulses in view of its input.

Figure 2:
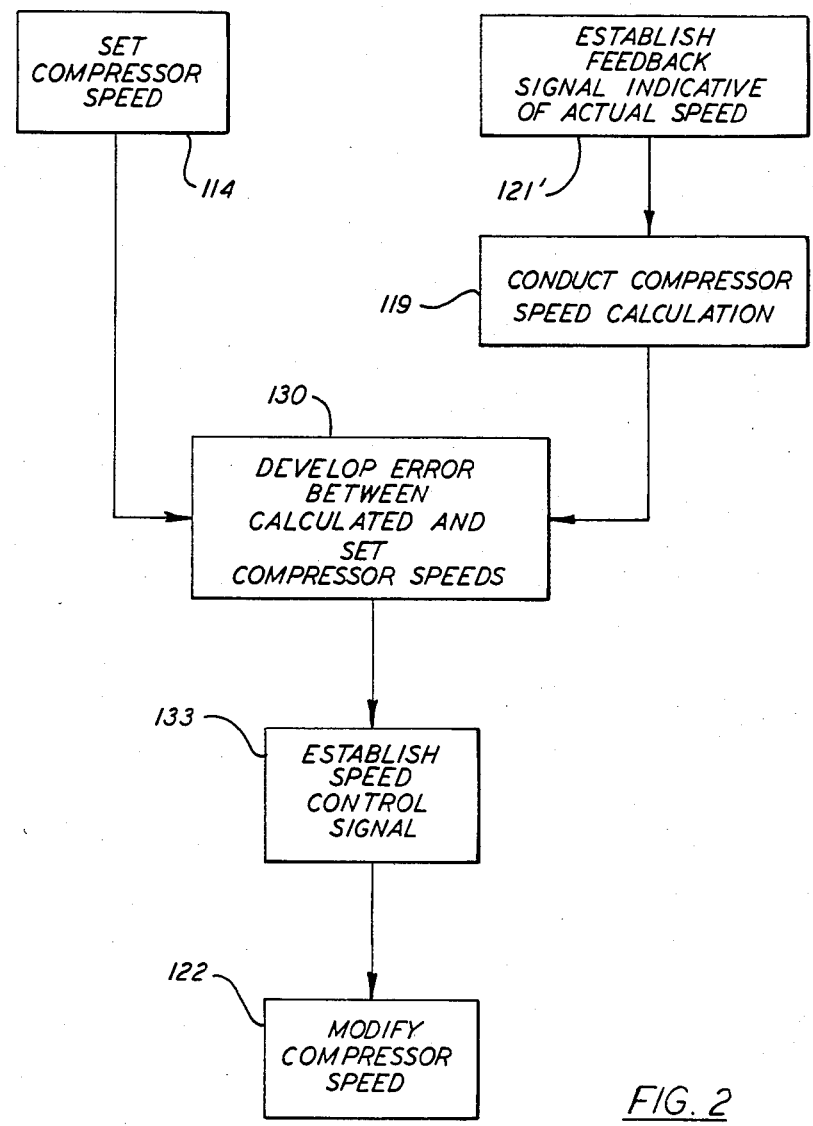
FIG. 2 is a flow chart illustrating in detail the operation of the arrangement of the invention addressed herein in order to accomplish accurate and effective speed control of a compressor for example installed in a heat pump system.

FIG. 2 is a flow chart which shows the general operation of the arrangement in FIG. 1. In particular, as discussed above, operation begins by setting a desired, requested or selected compressor speed as signal indication 14', as suggested by block 114 in FIG. 2, and establishing an RPM feedback speed signal or indication 21', as represented by block 121' in FIG. 2. Further, a calculation of compressor speed based upon the indicated feedback speed signal 21' is made at compressor speed calculation element 19 as suggested at block 119 of FIG. 2.

Next, an error signal 30' is developed between the result of the speed calculation of block 119, i.e. calculated speed indication 19', and the speed as set at block 114 according to logic element 14. As a result, a speed control signal or indication 33' is produced, as suggested at block 133 in FIG. 2, enabling effective current control and modification of compressor speed as operation proceeds through intervention of ECM controller 22.

While this invention has been described with reference to a particular embodiment disclosed herein, it is not confined to the details set forth herein and this application is intended to cover any modifications or changes as may come within the scope of the invention.

What is claimed is:

1. An electrically commutated motor (ECM) controller arrangement for controlling the operational speed of a variable speed motor compressor driven by an electrically commutated motor comprising an ECM controller for controlling the speed of the motor, said controller receiving back EMF signals from the electrically commutated motor and producing feedback signals representative of said back EMF, compressor speed logic means for generating a desired motor speed setpoint signal, compressor speed calculation means for calculating actual compresor speed signals from said EMF feedback signals produced by said electrically commutated motor controller, error means for monitoring the error between said desired motor speed setpoint and said calculated actual compressor speed signal, said error means producing an error signal indicative of said error, and duty cycle generator means for producing a speed control signal representative of said error signal, said speed control signal being transmitted to the ECM controller for adjusting the speed of the electrically commutated motor driven compressor.

2. The method of controlling the operational speed of an electrically comutated motor (ECM) compresor driven by an electrically commutated motor comprising the steps of setting a desired, predetermined compressor speed, generating a feedback signal from back EMF signals from the ECM indicative of actual compressor speed, conducting a compressor speed calculation representative of said back EMF, developing an error signal between said calculated and set compressor speeds, generating therefrom a speed control signal for application to an ECM controller, and modifying compressor speed in response to the level of said speed control signal to effect reduction in the level of said error signal.

3. The invention of claim 1, wherein the setting of said compressor speed is accomplished as a function of old and new room ambient temperature differences.

4. The invention of claim 2, wherein the setting of said compressor speed is accomplished as a function of old and new room ambient temperature differences.

5. The invention of claim 3, wherein said compressor speed is set as a function of $d_n K_1 + (d_n - d_o) K_2$, where $d_n$ and $d_o$ are respectively new and old room ambient temperature differences with respect to a thermostat selected set point temperature and $K_1$ and $K_2$ are system characteristic constants.

6. The invention of claim 4, wherein compressor speed is set as a function of $d_n K_1 + (d_n - d_o) K_2$, where $d_n$ and $d_o$ are respectively new and old room ambient temperature differences with respect to a thermostat selected set point temperature and $K_1$ and $K_2$ are system characteristic constants.

* * * * *